(12) United States Patent
Velez et al.

(10) Patent No.: US 7,974,912 B2
(45) Date of Patent: *Jul. 5, 2011

(54) PAID SEARCH ENGINE BID MANAGEMENT

(75) Inventors: Juan C. Velez, Los Angeles, CA (US); Daren Murrer, Hamilton, OH (US)

(73) Assignee: Paid Search Engine Tools LLC, Loveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/379,897

(22) Filed: Apr. 24, 2006

(65) Prior Publication Data

US 2006/0184503 A1    Aug. 17, 2006

Related U.S. Application Data

(63) Continuation of application No. 10/324,802, filed on Dec. 20, 2002, now Pat. No. 7,043,450, which is a continuation of application No. PCT/US01/41263, filed on Jul. 5, 2001.

(60) Provisional application No. 60/215,976, filed on Jul. 5, 2000.

(51) Int. Cl.
  *G06Q 40/00* (2006.01)
  *G06Q 30/00* (2006.01)
(52) U.S. Cl. ...... 705/37; 705/14.4; 705/14.48; 705/14.5
(58) Field of Classification Search ................ 705/37; 707/2
  See application file for complete search history.

(56) References Cited

U.S. PATENT DOCUMENTS

| | | |
|---|---|---|
| 5,752,238 A | 5/1998 | Dedrick |
| 5,794,210 A | 8/1998 | Goldhaber et al. |
| 5,794,219 A | 8/1998 | Brown |
| 5,818,914 A | 10/1998 | Fujisaki |
| 5,826,244 A | 10/1998 | Huberman |
| 5,835,896 A * | 11/1998 | Fisher et al. ............. 705/37 |

(Continued)

FOREIGN PATENT DOCUMENTS

DE    199 13 509 A1    9/1999

(Continued)

OTHER PUBLICATIONS

Google: Definition of System.*
Taylor, C.P.; "Engines of Growth", Brandweek, v45n11, Mar. 15, 2004, p. 81-83.
Howard B.; "Optimize Search Results Now, Target Marketing", v27n2, Feb. 2004, p. 81-83.
"BeFirst.com Announces Plans to Launch new Internet Search Engine—To Be called FindWhat.com", Business Wire, Jun. 28, 1999, 2 pages.

(Continued)

*Primary Examiner* — Olabode Akintola
(74) *Attorney, Agent, or Firm* — Wood, Herron & Evans, LLP

(57) ABSTRACT

A method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

62 Claims, 3 Drawing Sheets

U.S. PATENT DOCUMENTS

| | | | |
|---|---|---|---|
| 5,852,820 | A | 12/1998 | Burrows |
| 5,890,138 | A | 3/1999 | Godin et al. |
| 5,905,974 | A | 5/1999 | Fraser et al. |
| 5,905,975 | A | 5/1999 | Ausubel |
| 5,974,398 | A | 10/1999 | Hanson et al. |
| 5,983,205 | A | 11/1999 | Brams et al. |
| 6,021,398 | A | 2/2000 | Ausubel |
| 6,023,685 | A | 2/2000 | Brett et al. |
| 6,078,866 | A | 6/2000 | Buck et al. |
| 6,216,114 | B1 | 4/2001 | Alaia et al. |
| 6,243,691 | B1 | 6/2001 | Fisher et al. |
| 6,269,361 | B1 * | 7/2001 | Davis et al. ............... 1/1 |
| 6,272,473 | B1 | 8/2001 | Sandholm |
| 6,285,987 | B1 | 9/2001 | Roth et al. |
| 6,415,285 | B1 * | 7/2002 | Kitajima et al. ............ 707/5 |
| 6,421,675 | B1 * | 7/2002 | Ryan et al. ............... 707/100 |
| 6,457,009 | B1 | 9/2002 | Bollay |
| 6,519,570 | B1 | 2/2003 | Faber et al. |
| 6,601,044 | B1 | 7/2003 | Wallman |
| 6,609,112 | B1 | 8/2003 | Boarman et al. |
| 6,704,727 | B1 * | 3/2004 | Kravets ...................... 707/5 |
| 6,826,572 | B2 | 11/2004 | Colace et al. |
| 6,871,190 | B1 | 3/2005 | Seymour et al. |
| 6,907,405 | B2 | 6/2005 | Brett |
| 7,003,485 | B1 | 2/2006 | Young |
| 7,043,450 | B2 | 5/2006 | Velez et al. |
| 7,162,446 | B1 | 1/2007 | Handler |
| 7,225,151 | B1 | 5/2007 | Konia |
| 2001/0051911 | A1 | 12/2001 | Marks et al. |
| 2002/0099605 | A1 | 7/2002 | Weitzman et al. |
| 2002/0169760 | A1 | 11/2002 | Cheung et al. |
| 2003/0236739 | A1 | 12/2003 | Borgeson et al. |
| 2004/0088241 | A1 | 5/2004 | Rebane et al. |
| 2005/0144065 | A1 | 6/2005 | Calabria et al. |
| 2005/0240580 | A1 | 10/2005 | Zamir et al. |
| 2005/0256766 | A1 | 11/2005 | Garcia et al. |
| 2006/0010105 | A1 | 1/2006 | Sarukkai et al. |
| 2008/0015973 | A1 | 1/2008 | Erisman |

FOREIGN PATENT DOCUMENTS

| | | |
|---|---|---|
| EP | 0 987 644 A2 | 3/2000 |
| GB | 2 331 166 A | 12/1999 |
| WO | 00/57333 A2 | 9/2000 |

OTHER PUBLICATIONS

McKenzie, Matt; "Web Services Go Searching For Dollars; Will Consumers Accept Pay-to-Play Search Engine?", Seybold Report on Internet Publishing, v2n7, Jul. 1998, p. 22.

*Paid Search Engine Tools, LLC* v. *Google, Inc. and Microsoft Corp.*; US District Court, Eastern District of Texas, Marshall Division, Civil Action No. 2:08-cv-061; Defendant's Invalidity Contentions and Exhibits A-C.

WebPosition Analyzer; updated Apr. 18, 1998 http://web.archive.org/web/19990117033055/www.globalserve.net/~iwb/WebPosition/review.htm Cited by Yahoo! as 27 (first list) and 29 (second list).

Concise Summary Report, created Feb. 9, 1999 http://web.archive.org/web/19990209002305/www.webposition.com/reports/Concise-8.htm Cited by Yahoo! as 26 (first list) and 28 (second list).

Bid for Your Key-phrase, 1999 http://web.archive.org/web/19990902153628/www.searchhound.com/cgi-bin/sh_acc_pages.cgi?bids.htm Cited by Yahoo! as 24 (first list) and 25 (second list).

Bidding FAQ, 1999 http://web.archive.org/web/19990922001152/www.searchhound.com/Pages/bidfaq.htm.

EMERgency 24, Inc; 1997-1999; http://web.archive.org/web/19991013130720/7search.com/7spayperranking.htm Cited by Yahoo! as 2 (first list) and 11 (second list).

Overture Services, Inc.; Form 10-Q Quarterly Report; May 10, 2000 Cited by Yahoo! as 15 (second list).

ManagementBid.com; Welcome to ManageBid; http://web.archive.org/web/20010615125837/http://managebid.com/ index.html Cited by Yahoo! as 17 (second list).

ManagementBid.com; Overview of ManageBid; http://web.archive.org/web/20010615131537/http://managebid.com/overview.html Cited by Yahoo! as 16 (second list).

Improved Results; Instant Web Site Traffic; PPS date Jul. 12, 2002; http://www.instantwebsitetraffic.com/.

GoTo.com; Position Guardian; Copyright 2000, 2001; http://web.archive.org/web/20010203205900/positionguardian.com/evaluate.cfm.

*Paid Search Engine Tools, LLC* v. *Yahoo! Inc.*; US District Court, Eastern District of Texas, Marshall Division, Civil Action No. 2:07-cv-403; Yahoo! Inc.'s Invalidity Contentions and Attachments 1-5.

PayPerClick Universe; PPC Management and Monitoring; Copyright 2003-2004; http://web/archive.org/web/20051226205747/http://www.payperclickuniverse.com/pay-per-click-search-engines-tools-services.php?tool_id=16 Cited by Yahoo! as 18 (second list).

PPCBidTracker.com; Standard BidTracker Service; Copyright 2000; http://web.archive.org/web120010813140729/www.ppcbidtracker.com/index.exe?Services Cited by Yahoo! as 23 (second list).

PPCBidTracker.com; Standard BidTracker Pricing and Billing; Copyright 2000; http://web.archive.org/web/20010405203151/http://www.ppcbidtracker.com/index.exe?Pricing Cited by Yahoo! as 22 (second list).

PPCBidTracker.com; Standard BidTracker Welcome; Copyright 2000; http://web.archive.org/web/20010201063600//http://www.ppcbidtracker.com/ Cited by Yahoo! as 24 (second list).

WebPosition, Version 1.00.8 created Jul. 9, 1997; WebPosition Summary Report; http://web.archive.org/web/20010110230200/www.webposition.com/reports/Summary-8.htm Cited by Yahoo! as 31 (second list).

WebPosition, Version 1.00.8 created Jul. 9, 1997; WebPosition Trend Report; http://web.archive.org/web/20010110230200/www.webposition.com/reports/Trend-8.htm Cited by Yahoo! as 32 (second list).

Wilson; Review: Web Position Gold 1.0; Webmarketing Today, Issue 54, Mar. 1, 1999; http://web.archive.org/web/19990821083814/wilsonweb.com/reviews/webposition-gold.htm Cited by Yahoo! as 33 (second list).

First Place Software; WebPositionGOLD Software: Features and Benefits; Copyright 1997-1999; http://web.archive.org/web/19990421042139/www.webposition.com/product.htm#yahoo.

Findwhat.com; Media Kit, 14 pages, Dec. 16, 1999 Cited by Yahoo! as 14 (second list).

WebPosition, Version 1.2; WebPosition Key Features; http://web.archive.org/web/19990210182958/www.webposition.com/keyfeatures.htm Cited by Yahoo! as 30 (second list).

PositionGuardian—"About" page, Protect Your Position in GoTo.com; 2 pages, http://web.archive.org/—Cited by Yahoo! as 19 (second list).

BidRank.com; Overview, Copyright 2002; http://web.archive.org/web/20020803032711/www.bidrank.com/overview.html Cited by Yahoo! as 12 (second list).

PositionGuardian—"Demo" page, Protect Your Position in GoTo.com; Search Engine Optimization; Copyright 200, 2001, 6 pages.

PositionGuardian—Protect Your Position in GoTo.com; Evaluate; Copyright 2000, 2001, 1 page; http://web.archive.org/web/20010203205900/positionguardian.com/evaluate.cfm Cited by Yahoo! as 21 (second list).

JimTools.com, GoTo.com Keyword Wizard, web page from http://iimtools.com, published as least as early Nov. 15, 1999, archived at http://web.archive.org/.

Woodhead, R., web pages from http://selfpromotion.com/, published at least as early as Mar. 3, 2000, archived at http://web.archive.org.

RocketLinks.com web pages from http://www.rocketlinks.com, published at least as early as Mar. 1, 2000, archived at http://web.archive.org.

@Web Site Publicity, Inc., web page from http://www.websitepublicity.com, published at least as early as Feb. 11, 2001, archived at http://web.archive.org/.

U.S. Appl. No. 95/001,221, filed Aug. 12, 2009, Request for Inter-Partes Reexamination.

U.S. Appl. No. 95/001,221, filed Aug. 12, 2009, Decision to Grant Reexamination mailed Nov. 5, 2009.

JimTools.com, GoTo.com Keyword Wizard, web page from http://jimtools.com, published at least as early Nov. 15, 1999, archived at http://web.archive.org/.

\* cited by examiner

FIG. 4

PAID SEARCH ENGINE BID MANAGEMENT

CROSS REFERENCE TO RELATED APPLICATIONS

This application is a continuation of U.S. Ser. No. 10/324,802 filed Dec. 20, 2002, which is a continuation of PCT Application Serial No. U.S. 01/41263 filed Jul. 5, 2001, which is a continuation of U.S. provisional patent application Ser. No. 60/215,976, filed Jul. 5, 2000, all entitled "PAID SEARCH ENGINE BID MANAGEMENT", which are incorporated by reference herein in their entirety.

FIELD OF THE INVENTION

The present invention relates to the management of advertising expenses in online media.

BACKGROUND OF THE INVENTION

Use of the Internet has expanded at a nearly geometric rate in the most recent few years, both in the number of users online and the number of sites and associated content that content providers have made available online. The increases in both categories have enhanced the importance of so-called "portal" sites, such as large Internet access providers and popular Internet search engines. Statistics indicate that an overwhelming majority of traffic to Internet sites passes through such portal sites.

Until recently, Internet search engines have indexed available Internet sites by a process of search and selection. Professionals employed by the search engine sponsor identify and index Internet sites of potential interest to users. In some cases, this process would be embellished by "spidering" identified sites, i.e., traversing links within the site to accumulate word indexes for all reachable pages at the site. Content providers could participate in this process by submitting links to their site to the search engine, but other than through such submissions, could not influence whether these links would be added to the search engine.

Recently, a new model for a paid Internet search engine has been introduced, best exemplified by the site GoTo.com. In a paid Internet search engine, content providers submit bids for each one or more keywords they desire to associate with their site. The paid search engine will respond to a user's request for sites with one or more keywords, by producing a list of links to those sites that have submitted bids on those keywords. The order in which links are identified is determined by the bid amounts provided by the sites—the site with the largest (cumulative) bid(s) for the keywords(s) identified by the user, appears first in the list of sites presented to the user, followed by the site with the second largest (cumulative) bid(s) and so on. Content providers are invoiced the bid amount each time a link to the provider's site is used by a user to access that site.

As paid search engines become increasingly popular, the rate of change of bid amounts at those sites has increased, a consequence of competition for desirable keywords and relative positions in those keywords. To foster competition, paid search engines have provided facilities for bidders to monitor certain statistics, such as a daily count of "hits" on particular keywords, and reports of current bids on a given single keyword. However, paid search engines have not, to date, made such competitive information readily accessible. For example, a bidder can only view current bid positions of one keyword at a time, and has no mechanism for quickly identifying large gaps in bid amounts indicative of an opportunity for bid optimization. For a content provider managing tens or hundreds of keyword bids, the burden of evaluating each keyword individually can be substantial. The apparent reason for this situation is that paid search engines do not wish to incur the lost revenue that would result were the content providers able to fully optimize their bidding strategies, e.g., by quickly determining whether any current bids for keywords of interests can be lowered, without any or any important change in ranking relative to other bidders. A non-optimal bid on any given keyword, meaning any bid with a difference of greater than one cent from the next lower bid, represents consumer surplus captured by the paid search engine, which the search engine sponsor does not wish to relinquish.

To date, few services have been introduced to aid in bidding on paid search engine keywords. One such service accumulates generic statistics on the bid ranges for particular positions (e.g., 6, 12, etc.) for particular keywords at a paid search engine. This data is useful in selecting keywords on which to bid, but does not provide any assistance in managing bids that have been placed to ensure those bids are optimized and that a desired position has been maintained as competitors change their bids for the selected keywords.

SUMMARY OF THE INVENTION

The present invention provides a method and apparatus (information processing system) for overcoming these deficiencies and inefficiencies in the current paid search engine keyword bidding market. Specifically, the present invention provides keyword bidders with information they need to better optimize their use of paid search engines.

In accordance with a first aspect, the invention features accumulating bid amounts for a plurality of target keywords at one or more paid Internet search engines, and presenting the bid amounts to a user.

In specific embodiments of this aspect, bid amounts for either a single paid Internet search engine, or multiple paid Internet search engines, may be accumulated and presented. The bids accumulated may be, e.g., the 20 largest bids for each target keyword. Other information accumulated and/or presented may include a statistic or the rate of use of a target keyword by users of a paid search engine, demographics of users of a target keyword, demographics or commercial information regarding bidders for a target keyword, identification of additional keywords used in conjunction with the target keywords of users of a paid Internet search engine, and identification of additional keywords so bid upon by bidders for a target keyword.

In accordance with a second aspect, the invention features presenting bid amounts for a keyword at one or more paid Internet search engines, in a manner highlighting one or more selected bid amounts of interest to a potential bidder.

In specific embodiments of this aspect, the highlighted bid amount is a bid submitted by an identified entity, e.g., the entity to which said bid amounts are presented. Alternatively, or in addition, the highlighted bid amount(s) may be associated with a differential in bid amounts meeting certain criteria. These criteria may include identifying differentials in bid amounts characteristic of an opportunity for bid optimization, such as differentials between bids larger than a minimum currency amount. These criteria may alternatively include identifying differentials between bids of the entity to whom the presentation is made, and bids of other parties.

In accordance with a third aspect, the present invention features monitoring keyword bids at one or more paid Internet search engines to identify bid changes of interest to a potential bidder.

In specific embodiments of this aspect, the identified changes are those which create a differential in bid amounts meeting certain criteria. These criteria may include identifying differentials in bid amounts characteristic of bid optimization opportunities, such as differentials between bids larger than a minimum currency amount. These criteria may alternatively include identifying differentials between bids of the entity to whom the presentation is made, and bids of other parties.

The above and other objects and advantages of the present invention shall be made apparent from the accompanying drawings and the description thereof.

BRIEF DESCRIPTION OF THE DRAWING

FIG. 4 is an illustration of a keyword bid report.

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
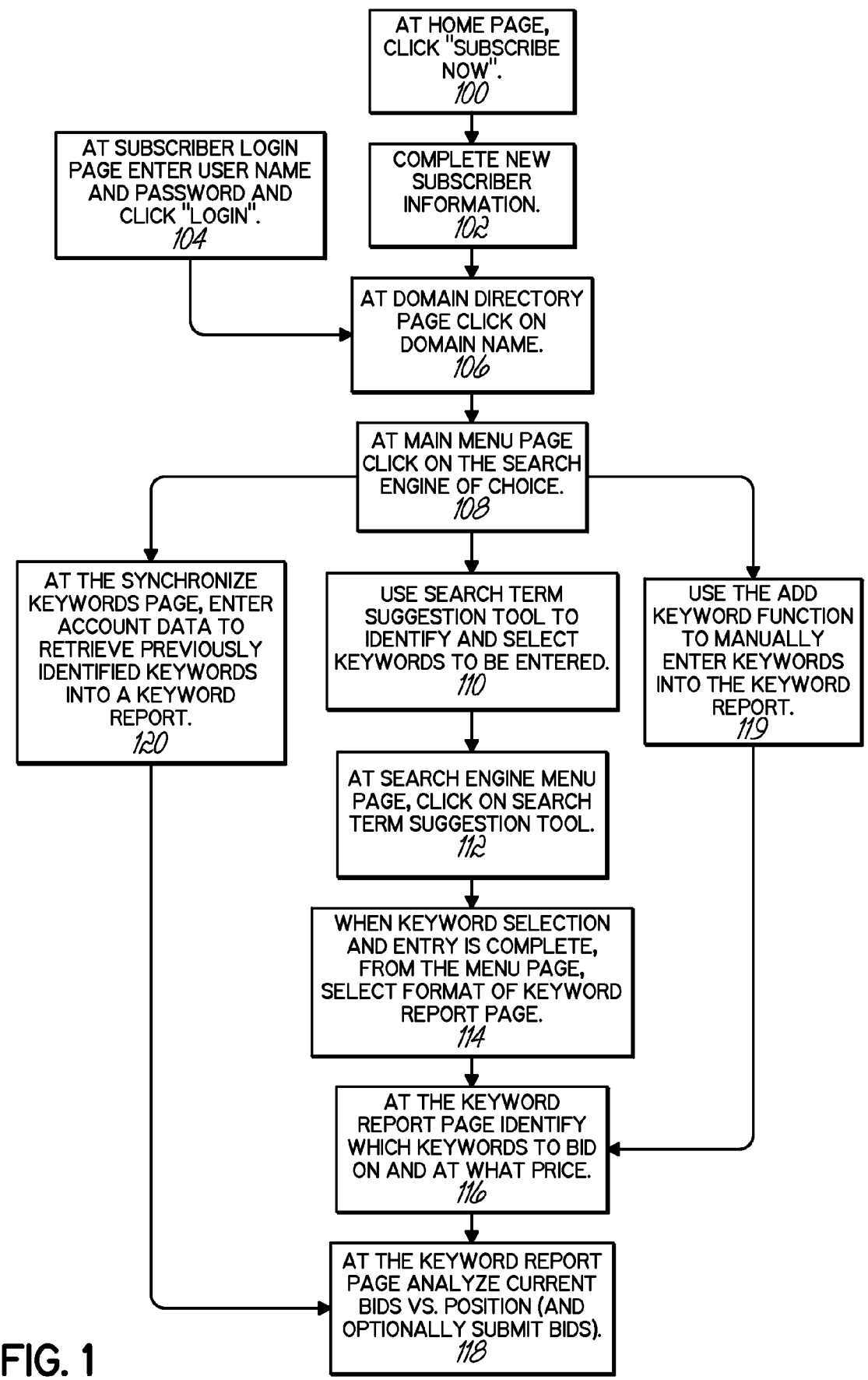
FIG. 1 is a flow chart illustrating a process for accumulating account and keyword information from a bidder to be used in keyword bid management.

The foregoing provides an exemplary description of an implementation of principles of the present invention. Referring to FIG. 1, a process for subscribing a bidder for the use of keyword bid optimization services can be described. It is anticipated that keyword bid optimization services will be provided through an Internet site either affiliated with or separate from a paid search engine or a plurality of paid search engines. Thus, the subscription process begins in step 100 at which a bidder uses a home page of a keyword bid optimization services website and requests to subscribe, e.g., by clicking on a subscribe now hyperlink. In a subsequent step 102, the subscriber provides subscriber information. The subscriber information may be limited the subscriber's name, address, telephone number and email contact information, or maybe more extensive, such as including credit card information, banking information such as bank accounts, that can be used for automatic entry in management of keyword bids as discussed below. Furthermore, a subscribers information may include information on the subscribers business, area of commerce, product line or other information useful in evaluating potential keywords of interest to that bidder.

A subscriber to the keyword bid optimization service may manage keywords bids for one or a number of Internet domain names to which that subscriber wishes to direct internet traffic from a paid search engine. The new subscriber information provided by the subscriber, therefore, includes the one or several domain names to which the subscriber wishes to direct internet traffic. These domain names are then used by the system to obtain reports of keyword bids and positions for those domain names.

A final part of the new subscriber information received in step 102 is a user name and password that may be used by the bidder to access the keyword bid optimization service and manage the bidding of keywords through the service. After a subscriber has enrolled, the subscriber may return as seen in step 104 to log into the service and thereby be associated with the previously stored customer information collected in step 102 including the subscribers keywords and domain names as well as other information collected. After a subscriber has completed subscription to the service in step 102, or when a subscriber returns and logs into the service, the subscriber is delivered to a domain directory page in step 106. In the domain directory page, the subscriber is presented with a list of domain names that have been entered by the subscriber. The subscriber can manage keyword bids for each domain name. In the domain directory page, a subscriber selects from among the domains being managed by the subscriber and clicks on that domain name to be delivered to a main menu page of options for managing keyword bids for the selected domain name.

Figure 4:
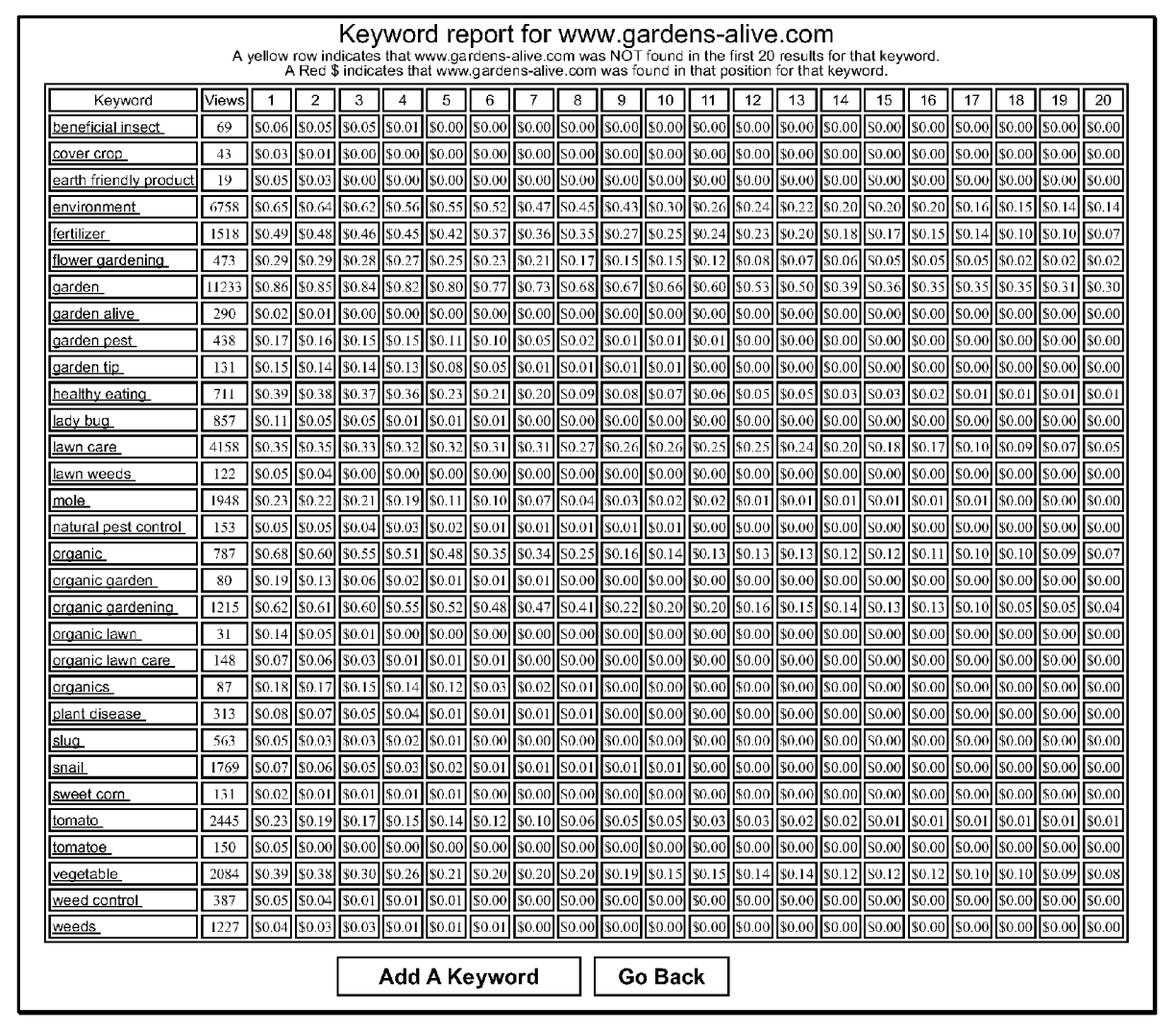

In the main menu page at step 108, the bidder has a number of options to utilize the keyword bid optimization service. A first option is to use a search word suggestion tool proceeding to step 110 to select and/or identify keywords that are of interest to the bidder. This process proceeds by selecting the search term suggestion tool from the menu page in step 112. At the search term suggestion tool page, the bidder may provide keywords or search terms for keywords which are submitted to a paid search engine to identify the current bids for those keywords, such as for example the twenty highest bids for the keywords. In addition, other summary information on the keywords may be provided, such as the number of times the keyword was searched by customer in a recent period, the bidders position and/or the position of competitors of the bidder who have been identified by the bidder in their subscriber information. Demographic information on individuals who have searched for companies or other information using that keyword. Related keywords, i.e., keywords used in conjunction with the identified keyword. The information that is collected is stored and presented to the bidder in an organized format. One example of such a format is shown in FIG. 4, and is a table of keywords identified by a bidder and provides information on the number of times that keyword has been accessed in the first twenty bids for that keyword in a paid search engine. In step 114, up to 100 keywords may be viewed in a table such as that shown in FIG. 4, or any other number of keywords as is appropriate for a particular application. From a keyword report table such as is shown in FIG. 4, a bidder may undertake a number of actions, including adding keywords, and deleting keywords. All of which are represented by step 114 in FIG. 1. Furthermore, a bidder may select a keyword to submit a bid for. Bidders may select keywords and then proceed through a separate browser window to the paid search engine to submit their bid directly to the paid search engine, or alternatively the keyword bid optimizing server may submit the bids itself. In either case, the step of submitting a bid is representing by step 116 in FIG. 1. Multiple bids may be submitted, and/or existing bids may be revised to optimize those bids based on current market conditions as reported in the table. Bids may also be monitored after their submission as represented in step 118. For example, a keyword report may be produced after the submission of bid to view the current keyword positions for the bidder and potentially also for competitors of the bidder. The bid of the bidder and/or competitors and/or bids that are separated by a gap suggesting possible optimization may be highlighted in the report of FIG. 4 to facilitate use of that report by the bidder.

The process described above utilizes a search term suggestion tool to select keywords for bidding. The user may also manually select keywords for bidding in step 119, and similarly proceed to view a keyword bid report, and submit bids in step 116 as described above. Alternatively, in step 120, the user may retrieve previously identified keywords associated with the users account and automatically produce a keyword report on those keywords. Thereafter in step 118, again the keyword report may be analyzed to determine the current bids, positions of those bids and other information of interest.

Figure 2:
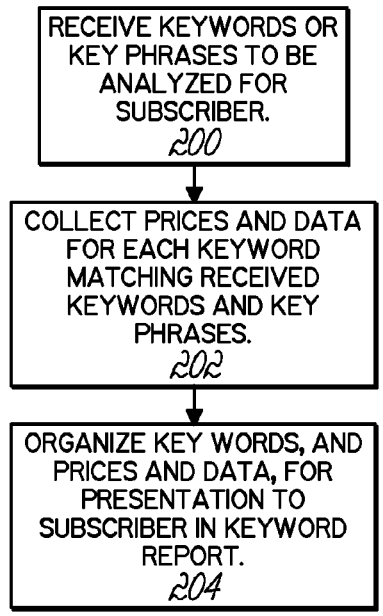
FIG. 2 is a flow chart illustrating a process for generation of a keyword report.

Referring to FIG. 2, the process for creating a keyword bid report can be further explained. In a first step 200, keywords or key phrases that are to be analyzed for a bidder are received by the system through one of the various processes described above. Then in step 202, prices and other data for each keyword as explained above are collected. Finally, in step 204, those keywords are and those prices and any other data such as optimization opportunities are presented in a report to the bidder.

Figure 3:
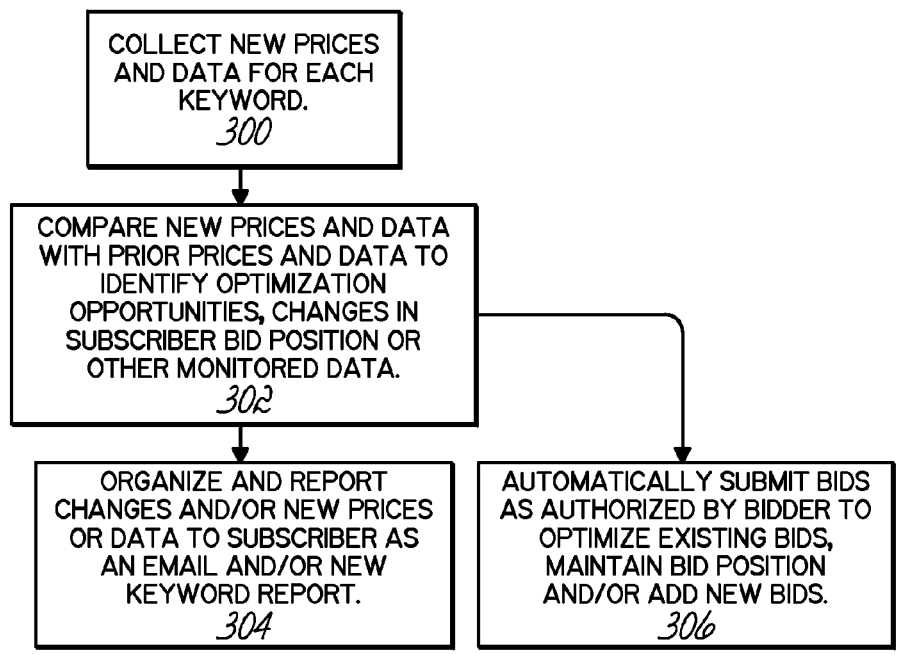
FIG. 3 is a flow chart illustrating a process for keyword bid monitoring for a bidders previously identified keywords of interest.

Referring now to FIG. 3, the process of monitoring keyword bids for a bidder can be explained. In a first step 300, prices and other data are collected for each keyword of a bidder that has been previously identified by the bidder. This process may proceed in a manner that minimizes burdens on the keyword search engine, such as by obtaining these items of data overnight while the keywords search engine is not heavily occupied. In a subsequent step 302, the new prices or data obtained in step 300 are compared to previously identified prices and data to identify new opportunities for optimization, changes in keyword bid position, or other monitored data such as an increase or decrease in the use of the keyword by users of the paid search engine. The changes that have been identified in step 302 are then communicated to the bidder. In one example, in step 304 the information collected in step 302 is organized and reported to the bidder in an electronic mail message, which may be simply a report of bid positions and prices for each of the keywords of the bidder, or may have more detailed information up to and including a complete keyword bid report of the format shown in FIG. 4 or of any other format. Alternatively, if authorization has been obtained from the bidder, the keyword bid optimizing service may automatically submit new bids for the bidder to the paid search engine. For example, bid prices may be increased or lowered, as needed to meet the bidders pre-identified requirements. Bids may be increased in order to recapture the bidder position desired by the bidder. Bids may be decreased whenever a gap of greater than the minimum bid difference exists between the bidders bid and the next lower bid. Automatic optimization of bids in this manner permits the bidder to be freed of the burden of resubmitting bids with each new optimization opportunity. It will be noted that the automatic submission of new bids in step 306 and the reporting of changes in step 304 may be combined so that bid changes are made and reported to a bidder with whatever frequency is desired.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method that manages pay-per-click advertising, by determining an amount to be charged in response to a click of a hyperlink associated with a target keyword, comprising
   accessing with a computer processor, a particular amount a first advertiser is willing to be charged in response to a click of a hyperlink associated with said first advertiser,
   accessing with a computer processor, a statistic of relevance to said first advertiser and a statistic of relevance to a second advertiser, said statistics being related to one or more of rate of use by users, number of times a hyperlink was viewed, data that relates to an increase or decrease in the use of a keyword by users, demographics of users associated with a keyword, or demographics of advertisers associated with a keyword, and
   without human intervention, determining with a computer processor, an amount to be charged to said second advertiser in response to a click of a hyperlink associated with said target keyword and said second advertiser,
   wherein said amount to be charged to said second advertiser is determined using said particular amount, and is also determined using said statistic of relevance to said first advertiser and said statistic of relevance to said second advertiser.

2. The method of claim 1 wherein at least one said statistic comprises a statistic on the rate of use of a keyword.

3. The method of claim 1 wherein at least one said statistic is related to a number of times a link to an advertiser's web site is produced by a paid search engine over a period of time.

4. The method of claim 1 further comprising accessing additional keywords related to the target keyword.

5. The method of claim 1 further comprising providing at least one said statistic for display on a single display screen to a user.

6. The method of claim 5 further comprising providing said amount for display on said single display screen.

7. The method of claim 1 further comprising providing said amount for display on a single display screen to a user.

8. The method of claim 1 further comprising sending at least one said statistic to a person responsible for making decisions on the second advertiser's use of pay-per-click marketing.

9. The method of claim 1 wherein said determining step is performed by a computer responsible for making decisions on said second advertiser's use of pay-per-click marketing.

10. The method of claim 9 further comprising sending said amount from said computer responsible for making decisions.

11. The method of claim 1 further comprising sending said amount to a computer responsible for making decisions on said second advertiser's use of pay-per-click marketing.

12. The method of claim 1 wherein said amount meets pre-identified requirements of said second advertiser.

13. The method of claim 1 wherein determining the amount includes the use of a minimum currency amount.

14. The method of claim 1 further comprising identifying keywords that have been used in conjunction with the keyword.

15. The method of claim 1 wherein one of said statistics comprises a statistic on the rate of use of a keyword and the other of said statistics is related to a number of times a link to an advertiser's web site is produced by the paid search engine over a period of time.

16. The method of claim 1 wherein said hyperlink associated with said first advertiser is ranked below said hyperlink associated with said second advertiser.

17. A method that manages pay-per-click advertising, by determining an amount to be charged in response to a click of a hyperlink associated with a target keyword, comprising
   accessing with a computer processor, a particular amount a first advertiser is willing to be charged in response to a click of a hyperlink associated with said first advertiser,
   accessing with a computer processor, first and second different statistics related to one or more of a rate of use by users, number of times a hyperlink was viewed, data that relates to an increase or decrease in the use of a keyword by users, demographics of users associated with a keyword or demographics of advertisers associated with a keyword, and
   without human intervention, determining with a computer processor, an amount to be charged to a second advertiser in response to a click of a hyperlink associated with said target keyword and said second advertiser,
   wherein said amount to be charged to said second advertiser is determined using said particular amount, and is also determined using said first and second statistics.

18. The method of claim 17 wherein the statistic on a rate of use comprises a statistic on rate of use of a keyword.

19. The method of claim 17 wherein the statistic on a rate of use is related to a number of times a link to an advertiser's web site is produced by the paid search engine over a period of time.

20. The method of claim 17 wherein said amount meets pre-identified requirements of said second advertiser.

21. The method of claim 17 further comprising providing at least one statistic for display on a single display screen to a user.

22. The method of claim 21 further comprising providing said amount for display on said single display screen.

23. The method of claim 17 further comprising providing said amount for display on a single display screen to a user.

24. The method of claim 17 further comprising sending at least one said statistic to a person responsible for making decisions on said second advertiser's use of the pay-per-click search engine.

25. The method of claim 17 wherein said determining step is performed by a computer responsible for making decisions on said second advertiser's use of the pay-per-click search engine.

26. The method of claim 25 further comprising sending said amount from said computer responsible for making decisions.

27. The method of claim 17 further comprising sending said amount to a computer responsible for making decisions on said second advertiser's use of the pay-per-click search engine.

28. The method of claim 17 further comprising determining a position of a hyperlink associated with an advertiser-specified Internet address relative to other hyperlinks associated with the keyword.

29. The method of claim 17 wherein determining the amount includes the use of a minimum currency amount.

30. The method of claim 17 further comprising identifying keywords related to the target keyword.

31. The method of claim 17 wherein said hyperlink associated with said first advertiser is ranked below said hyperlink associated with said second advertiser. identifying keywords related to the target keyword.

32. A computer system that manages pay-per-click advertising, by determining an amount to be charged in response to a click of a hyperlink associated with a target keyword, comprising
   a memory, and
   processing hardware configured to:
   access from memory a particular amount a first advertiser is willing to be charged in response to a click of a hyperlink associated with said target keyword and associated with said first advertiser,
   access from memory a statistic of relevance to said first advertiser and a statistic of relevance to a second advertiser, said statistics being related to one or more of rate of user by users, number of times a hyperlink was viewed, data that related to an increase or decrease in the use of a keyword by users, demographics of users associated with a keyword, or demographics of advertisers associated with a keyword, and
   without human intervention, determine an amount charged to a second advertiser in response to a click of a hyperlink associated with said target keyword and said second advertiser,
   wherein said amount to be charged to said second advertiser is determined using said particular amount, and is also determined using said statistic of relevance to said first advertiser and said statistic of relevance to said second advertiser.

33. The computer system of claim 32 wherein at least one said statistic comprises a statistic on the rate of use of a keyword.

34. The computer system of claim 32 wherein at least one said statistic is related to a number of times a link to an advertiser's web site is produced by the paid search engine over a period of time.

35. The computer system of claim 32 wherein said processing hardware is configured to access additional keywords related to the target keyword.

36. The computer system of claim 32 wherein said processing hardware is configured to provide at least one said statistic for display on a single display screen to a user.

37. The computer system of claim 36 wherein said processing hardware is configured to provide said amount for display on said single display screen.

38. The computer system of claim 32 wherein said processing hardware is configured to provide said amount for display on a single display screen to a user.

39. The computer system of claim 32 wherein said processing hardware is configured to send at least one said statistic to a person responsible for making decisions on the second advertiser's use of pay-per-click marketing.

40. The computer system of claim 32 wherein said processing hardware includes a computer responsible for making decisions on said second advertiser's use of pay-per-click marketing configured to determine said amount.

41. The computer system of claim 40 wherein said processing hardware is configured to send said amount from said computer responsible for making decisions.

42. The computer system of claim 32 wherein said processing hardware is configured to send said amount to a computer responsible for making decisions on said second advertiser's use of pay-per-click marketing.

43. The computer system of claim 32 wherein said amount meets pre-identified requirements of said advertiser.

44. The computer system of claim 32 wherein the determination of the amount includes the use of a minimum currency amount.

45. The computer system of claim 32 wherein said processing hardware is configured to identify keywords that searchers have used in conjunction with the target keyword.

46. The method of claim 32 wherein one of said statistics comprises a statistic on the rate of use of a keyword and the other of said statistics is related to a number of times a link to an advertiser's web site is produced by the paid search engine over a period of time.

47. The system of claim 32 wherein said hyperlink associated with said first advertiser is ranked below said hyperlink associated with said second advertiser.

48. A computer system that manages pay-per-click advertising, by determining an amount to be charged in response to a click of a hyperlink associated with a target keyword, comprising
 a memory, and
 processing hardware configured to:
  access from memory a particular amount a first advertiser is willing to be charged in response to a click of a hyperlink associated with said first advertiser,
  access from memory first and second different statistics related to one or more of a rate of use by users, number of times a hyperlink was viewed, data that relates to an increase or decrease in the use of a keyword by users, demographics of users associated with a keyword or demographics of advertisers associated with a keyword, and
  without human intervention, determine an amount, to be charged to a second advertiser in response to a click of a hyperlink associated with said target keyword and said second advertiser,
  wherein said amount to be charged to said second advertiser is determined using said particular amount, and is also determined using said first and second statistics.

49. The computer system of claim 48 wherein the statistic on rate of use comprises a statistic on rate of use of a keyword.

50. The computer system of claim 48 wherein the statistic on rate of use is related to a number of times a link to an advertiser's web site is produced by the paid search engine over a period of time.

51. The computer system of claim 48 wherein said amount meets pre-identified requirements of said second advertiser.

52. The computer system of claim 48 wherein said processing hardware is configured to provide said at least one statistic for display on a single display screen to a user.

53. The computer system of claim 52 wherein said processing hardware is configured to provide said amount for display on said single display screen.

54. The computer system of claim 48 wherein said processing hardware is configured to provide said amount for display on a single display screen to a user.

55. The computer system of claim 48 wherein said processing hardware is configured to send at least one said statistic to a person responsible for making decisions on said second advertiser's use of the pay-per-click search engine.

56. The computer system of claim 48 wherein said processing hardware includes a computer responsible for making decisions on said second advertiser's use of the pay-per-click search engine.

57. The computer system of claim 56 wherein said processing hardware is configured to send said amount from said computer responsible for making decisions.

58. The computer system of claim 48 wherein said processing hardware includes a computer responsible for making decisions on said second advertiser's use of the pay-per-click search engine, said processing hardware configured to send said amount to said computer responsible for making decisions.

59. The computer system of claim 48 wherein said processing hardware is configured to determine a position of a hyperlink associated with an advertiser-specified Internet address relative to other hyperlinks associated with the target keyword.

60. The computer system of claim 48 wherein the determination of the amount includes the use of a minimum currency amount.

61. The computer system of claim 48 wherein said processing hardware is configured to identify keywords related to the target keyword.

62. The system of claim 48 wherein said hyperlink associated with said first advertiser is ranked below said hyperlink associated with said second advertiser.

* * * * *

US007974912C1

(12) INTER PARTES REEXAMINATION CERTIFICATE (1055th)
United States Patent
Velez et al.

(10) Number: US 7,974,912 C1
(45) Certificate Issued: *Feb. 20, 2015

(54) PAID SEARCH ENGINE BID MANAGEMENT

(75) Inventors: Juan C. Velez, Los Angeles, CA (US); Daren Murrer, Hamilton, OH (US)

(73) Assignee: Paid Search Engine Tools, LLC, Loveland, OH (US)

Reexamination Request:
No. 95/001,863, Dec. 28, 2011

Reexamination Certificate for:
Patent No.: 7,974,912
Issued: Jul. 5, 2011
Appl. No.: 11/379,897
Filed: Apr. 24, 2006

(*) Notice: This patent is subject to a terminal disclaimer.

Related U.S. Application Data

(63) Continuation of application No. 10/324,802, filed on Dec. 20, 2002, now Pat. No. 7,043,450, which is a continuation of application No. PCT/US01/41263, filed on Jul. 5, 2001.

(60) Provisional application No. 60/215,976, filed on Jul. 5, 2000.

(51) Int. Cl.
*G06Q 40/00* (2012.01)
*G06Q 30/02* (2012.01)

(52) U.S. Cl.
CPC ............................. *G06Q 30/02* (2013.01)

USPC ......... 705/37; 705/14.4; 705/14.5; 705/14.48

(58) Field of Classification Search
None
See application file for complete search history.

(56) References Cited

To view the complete listing of prior art documents cited during the proceeding for Reexamination Control Number 95/001,863, please refer to the USPTO's public Patent Application Information Retrieval (PAIR) system under the Display References tab.

*Primary Examiner* — Jalatee Worjloh

(57) ABSTRACT

A method and apparatus (information processing system) for overcoming deficiencies and inefficiencies in the current paid search engine keyword bidding market, by providing keyword bidders with information they need to better optimize their use of paid search engines. The system accumulates bid amounts for a plurality of target keywords at one or more paid Internet search engines, and presents the bid amounts to a user, enabling the user to evaluate and optimize bids on those keywords. The system also presents bid amounts for a keyword at one or more paid Internet search engines, in a manner highlighting one or more selected bid amounts of interest to a potential bidder. This permits a bidder to identify the bidder's own bid, and/or to identify a differential in bid amounts that indicates an opportunity for bid optimization. The system further monitors keyword bids at one or more paid Internet search engines to identify bid changes of interest to a potential bidder.

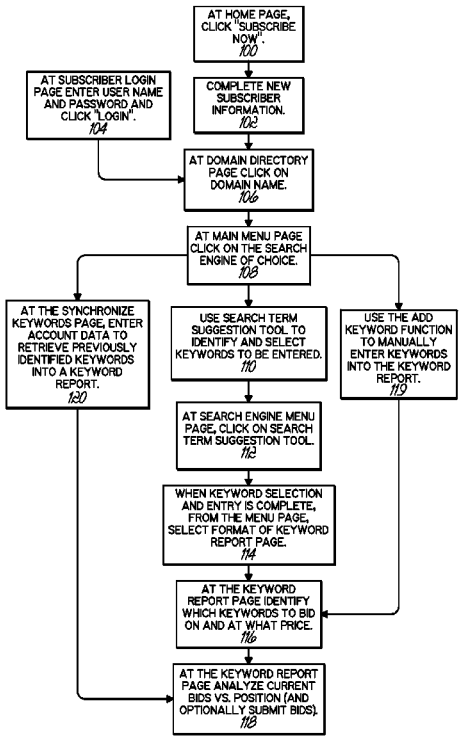

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-62 are cancelled.

\* \* \* \* \*